(12) United States Patent
Dial et al.

(10) Patent No.: US 10,161,505 B2
(45) Date of Patent: Dec. 25, 2018

(54) DEVICES AND METHODS FOR INCREASING THE STRENGTH OF AN AUTOMOTIVE TRANSMISSION

(71) Applicant: Sonnax Transmission Company, Bellows Falls, VT (US)

(72) Inventors: James A. Dial, Springfield, MO (US); Eric W. Streed, Surry, NH (US)

(73) Assignee: Sonnax Transmission Company, Bellows Falls, VT (US)

( * ) Notice: Subject to any disclaimer, the term of this patent is extended or adjusted under 35 U.S.C. 154(b) by 52 days.

(21) Appl. No.: 15/424,361

(22) Filed: Feb. 3, 2017

(65) Prior Publication Data

US 2017/0219091 A1    Aug. 3, 2017

Related U.S. Application Data

(60) Provisional application No. 62/290,766, filed on Feb. 3, 2016.

(51) Int. Cl.
*F16H 61/00* (2006.01)
*F16H 61/30* (2006.01)

(52) U.S. Cl.
CPC ......... *F16H 61/0009* (2013.01); *F16H 61/30* (2013.01); *F16H 2061/0062* (2013.01)

(58) Field of Classification Search
None
See application file for complete search history.

(56) References Cited

U.S. PATENT DOCUMENTS 5,624,342 A * 4/1997 Younger ............. F16H 61/0267
475/116
5,820,507 A * 10/1998 Younger ............. F16H 61/0206
475/116

* cited by examiner

*Primary Examiner* — Jacob S. Scott
*Assistant Examiner* — Timothy Hannon
(74) *Attorney, Agent, or Firm* — Downs Rachlin Martin PLLC

(57) ABSTRACT

Methods for modifying certain prior art automatic transmissions to strengthen the transmission and eliminate a tendency of the transmissions to fail as well as components for doing the same. Some aspects also include kits for modifying a transmission to increase the strength of the transmission. In some examples, the hydraulic system of a General Motor's model number 4L80E transmission is modified so that an overrun clutch is engaged in more modes of operation than the original equipment prior art 4L80E transmission in order to minimize a tendency for an overdrive roller clutch to fail.

17 Claims, 11 Drawing Sheets

DEVICES AND METHODS FOR INCREASING THE STRENGTH OF AN AUTOMOTIVE TRANSMISSION

RELATED APPLICATION DATA

This application claims the benefit of priority of U.S. Provisional Patent Application Ser. No. 62/290,766, filed Feb. 3, 2016, and titled Devices and Methods For Increasing the Strength Of An Automotive Transmission, which is incorporated by reference herein in its entirety.

FIELD OF THE INVENTION

The present invention generally relates to the field of automotive transmissions. In particular, the present invention is directed to devices and methods for increasing the strength of an automotive transmission.

BACKGROUND

A cross sectional diagram of a top-half portion of a prior art General Motors (GM) 4L80-E four speed transmission 100 is shown in FIG. 1. The 4L80-E transmission went into production in the early 1990s and the design of the transmission was based on GM's Turbo-Hydramatic (THM) 400 three speed transmission that was produced in the 1960s. The THM 400 was used in many full size passenger cars and trucks through the late 1980s and was well accepted because of its longevity and low maintenance. The 4L80-E incorporated some of the heavy-duty features of the THM 400 with an additional fourth gear with an over-driven ratio and also added a torque converter clutch, both additions providing improved fuel economy relative to the THM 400. The majority of the gears and clutches for reverse and first through third gears are shown within dashed line 102 in FIG. 1 and have a similar configuration to the THM 400. The additional components that were added to the THM design for providing a fourth gear are generally located to the left of the box formed by dashed line 102 in FIG. 1.

The gears and clutches for providing the additional over-driven fourth gear in the 4L80-E include an overdrive planetary gear set 104, which includes four planetary gears 106 (only one of which is visible in FIG. 1) and planetary carrier assembly 108. The fourth gear set also includes an overdrive roller clutch 110, an overrun clutch drum 112, and a sun gear 114 attached to the overrun clutch drum. The fourth gear set also includes a ring gear 116, which is attached to a forward clutch drum 118. The fourth gear set also includes a fourth clutch drum housing 120, fourth gear clutch 121, and overrun clutch 122. Engine torque in the GM 4L80 E is transmitted through the fourth gear set from torque converter turbine shaft 124 to the overdrive planetary gear set 104 via the geared coupling of the planetary carrier assembly 108 to the turbine shaft. In reverse and first through third gears, torque is transmitted from the planetary carrier assembly 108 to the overrun clutch drum 112 and sun gear 114 via either the overdrive roller clutch 110 or the overrun clutch 122. Torque is then transmitted from the sun gear 114 to the planetary gears 106 and ring gear 116 to the downstream gear sets within the box formed by dashed line 102. Thus, the entire load transmitted through transmission 100 at any given time when in gears 1-3 and reverse is borne by either overdrive roller clutch 110 or both the overdrive roller clutch and overrun clutch 122, depending on the mode of operation. In fourth gear, the fourth gear clutch 121 is engaged, causing the overrun clutch drum 112 to be stationary and torque is transmitted from the planetary carrier assembly 108 and planetary gears 106 directly to ring gear 116.

FIGS. 2 and 3 are partial hydraulic circuit diagrams for the prior art GM 4L80-E transmission 100 and compare the hydraulic configuration of the GM 4L80-E when in first gear when a manual valve 202 in two different positions 204. As shown in FIGS. 2 and 3, the GM 4L80-E manual valve 202 has seven positions 204, including Park (P), reverse (R), neutral (N), drive-4 (D) also referred to herein as the overdrive position or top gear position, manual-3 (3), manual-2 (2), and manual-1, the manual-3, 2, and 1 positions also referred to herein as lower gear positions. When the manual valve is in the overdrive or top gear position, during operation, transmission 100 will automatically shift between all forward gears, i.e., gears one through four, depending on the speed of the vehicle. When manual valve 202 is in manual-3 or 2, the transmission will only automatically shift up to the third or second gear, respectively, and when in manual-1, will remain in the first gear at all times. The position of the manual valve 202 is controlled by a gearshift in the vehicle (not illustrated). During normal vehicle operation, a user often places the manual valve in the drive-4 (overdrive) position and leaves it there when driving. A user may select manual 1-3 when, e.g., the vehicle is operating under a heavy load or when on a steep decline.

FIG. 2 shows the manual valve 202 in the overdrive or top gear position and shows the transmission 100 in first gear. As shown, pressurized transmission fluid is routed through a forward clutch feed passageway 206 to engage a forward clutch 208. The 4L80-E hydraulic system also includes a overrun clutch feed passageway 210 for routing pressurized transmission fluid to the overrun clutch 122 for engaging the overrun clutch in certain modes of operation. Manual valve 202 is in direct fluid communication with overrun clutch 122 via clutch feed passageway 210. As shown in FIG. 2, when the manual valve 202 is in the top gear position, the manual valve blocks pressurized transmission fluid from entering the overrun clutch feed passageway 210 and, therefore, the overrun clutch 122 is not engaged. Overrun clutch feed passageway 210 includes a check ball 212 (referred to by the OE manufacturer as the #1 check ball), which includes a seat passage 214 and orifice passage 216.

FIG. 3 shows the manual valve 202 in the lower gear manual-3 position and the transmission in first gear. As in FIG. 2, pressurized transmission fluid is routed through the forward clutch feed passageway 206 to the forward clutch 208. Unlike FIG. 2, with the manual valve 202 in the manual-3 position, the manual valve is no longer blocking pressurized transmission fluid from entering the overrun clutch feed passageway 210, and the pressurized transmission fluid engages the overrun clutch 122. As can be appreciated from a review of FIGS. 2 and 3, pressurized transmission fluid is also routed to the overrun clutch 122 in manual valve positions manual-2, and manual-1, in other words, in all of the lower gear positions, and is blocked when the manual valve is in park, reverse, neutral, and overdrive.

The prior art GM 4L80-E transmission 100, therefore, relies on the overdrive roller clutch 110 to provide a link between the planetary gear sets and output shaft 130 to propel the vehicle at all times when the manual valve 202 is in the reverse and overdrive positions. The overrun clutch 122 is not engaged to provide a backup for the overdrive roller clutch 110 unless the manual valve 202 is in the lower gear positions, i.e., manual-3, 2, or 1 positions. The overdrive roller clutch 110 is a non-hydraulic one-way clutch that includes rollers that slip or free-wheel when rotated in one direction and bind to prevent relative rotation in the other direction. The roller clutch 110, therefore provides improved fuel efficiency when coasting by not transmitting backward torque from the output shaft to the torque converter, avoiding engine braking. The overrun clutch 122 is a hydraulic multi-plate clutch pack such that when it is engaged, it does not allow relative rotation in either direction, thereby resulting in some engine braking when coasting and, therefore, may reduce fuel efficiency when engaged. The prior art GM 4L80-E overdrive roller clutch 110 is not as strong as the overrun clutch 122 and there has been a tendency for the overdrive roller clutch to fail.

SUMMARY OF THE DISCLOSURE

In one implementation, the present disclosure is directed to a method of modifying an automatic transmission, the transmission having at least one planetary gear set that provides a plurality of forward gears including a top gear and at least one lower gear, a hydraulic system including fluid passages and a manual valve having a top gear position in which the transmission will automatically shift between all of the forward gears and at least one lower gear position in which the transmission will not shift into the top gear, and a hydraulic clutch, wherein the manual valve controls the hydraulic clutch via direct fluid communication through the fluid passages and only engages the hydraulic clutch when the manual valve is in the at least one lower gear position. The method includes modifying the hydraulic system to eliminate said direct fluid communication so that the hydraulic clutch is not controlled by the manual valve and the hydraulic clutch is engaged whenever the transmission is in the at least one lower gear.

In another implementation, the present disclosure is directed to a method of modifying a transmission, the transmission having a plurality of forward gears including a top gear and at least one lower gear, a hydraulic clutch, a hydraulic system including a clutch feed passageway for engaging the hydraulic clutch and a line pressure passageway, and a manual valve that controls the hydraulic clutch and controls a range of the forward gears the transmission will shift between. The method includes fluidly connecting a valve to the clutch feed passageway and line pressure passageway so that the valve engages the hydraulic clutch independently of a position of the manual valve.

In still another implementation, the present disclosure is directed to a kit for modifying an automatic transmission, the automatic transmission including a valve body having a line pressure passageway, a hydraulic clutch feed passageway, and a top gear clutch feed passageway. The kit includes a valve for fluidly connecting the line pressure passageway to the hydraulic clutch feed passageway and for fluidly connecting the valve to the top gear clutch feed passageway, the valve being configured to close when the top gear clutch is applied; and a drill template for drilling a plurality of openings in the valve body for fluidly connecting the line pressure passageway, hydraulic clutch feed passageway, and top gear clutch feed passageway to the valve.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Aspects of the present disclosure include methods for modifying certain prior art automatic transmissions to strengthen the transmission and eliminate a tendency of the transmissions to fail. Some aspects also include kits for modifying a transmission to increase the strength of the transmission. In some examples, the hydraulic system of a General Motor's model number 4L80E transmission is modified so that an overrun clutch is engaged in more modes of operation than the original equipment (OE) prior art 4L80E transmission in order to minimize a tendency for an overdrive roller clutch to fail. The term "Original Equipment" and the abbreviation OE, and similar terms, as used herein, refer not only to transmissions and associated components originally manufactured by a transmission manufacturer or originally sourced by a transmission manufacturer, but also refers to any aftermarket components that substantially conform to the OE dimensions and specifications, for example, an aftermarket replacement component for replacing a component of a transmission originally provided in a transmission.

Figure 2:
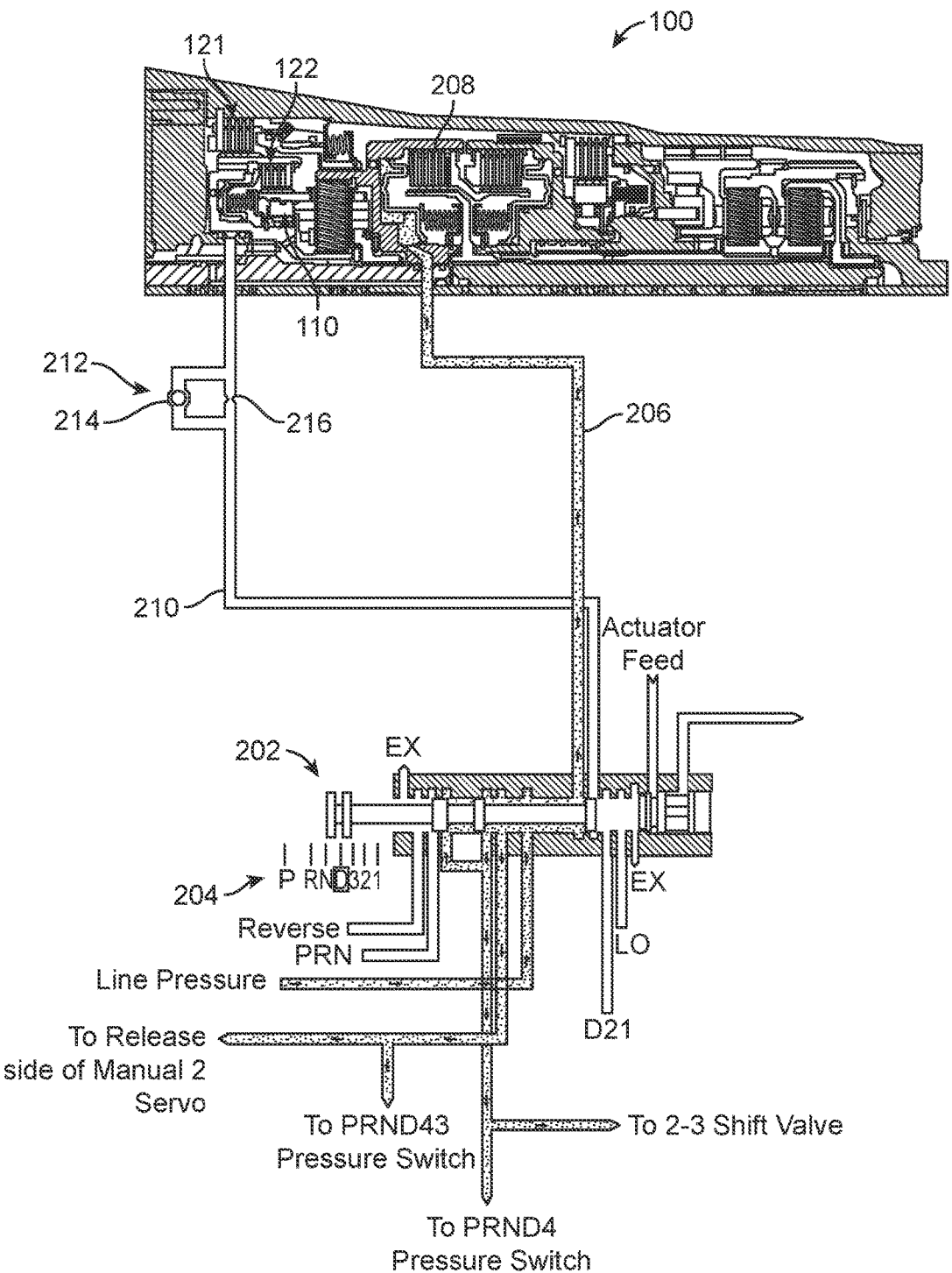
FIG. 2 is a partial hydraulic circuit diagram of the prior art transmission of FIG. 1 showing a manual valve in a overdrive position and the transmission in first gear.
Figure 3:
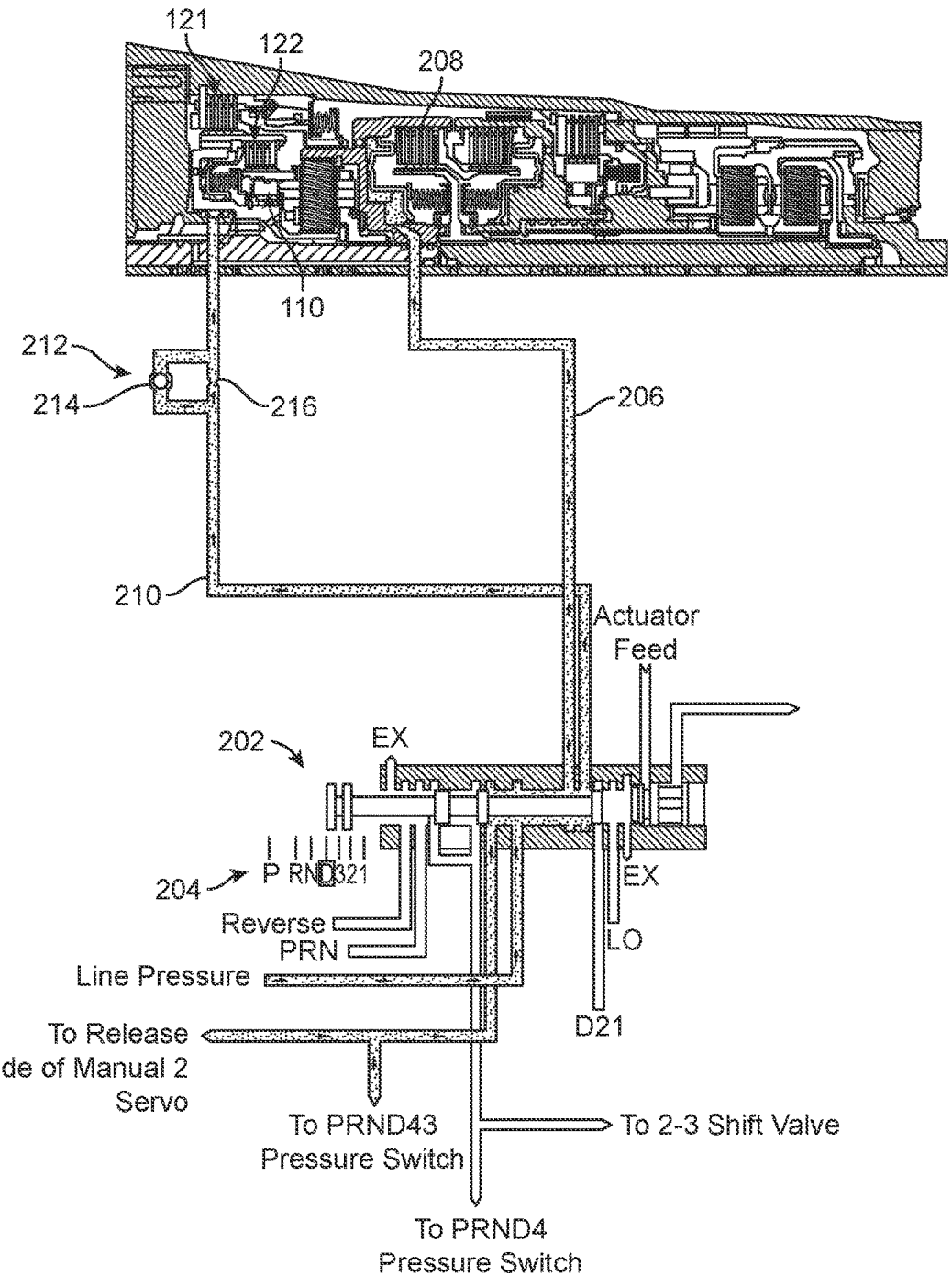
FIG. 3 is a partial hydraulic circuit diagram of the prior art transmission of FIG. 1 showing the manual valve in a manual-3 position and the transmission in first gear.
Figure 4:
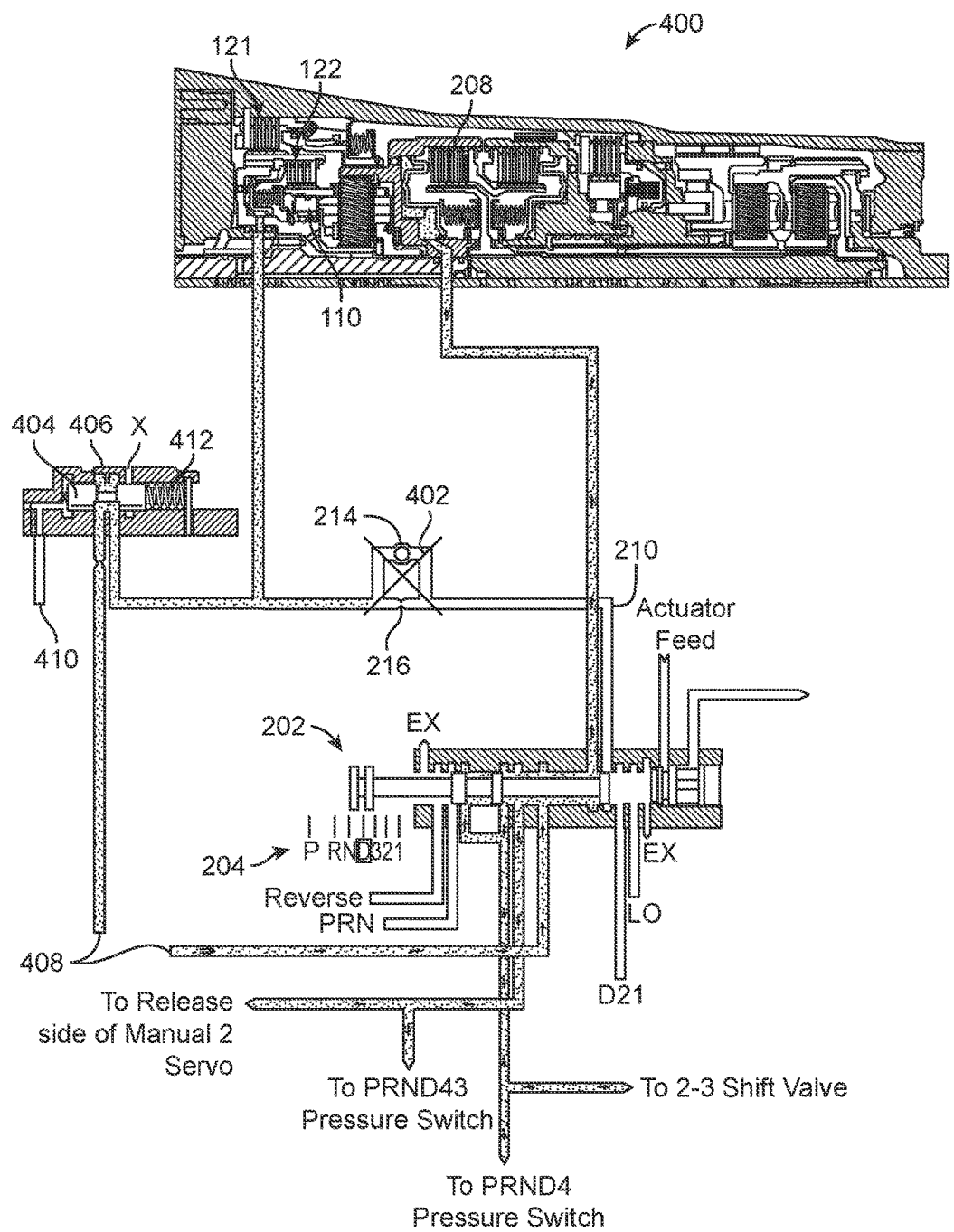
FIG. 4 is a partial hydraulic circuit diagram of a modified GM 4L80E transmission.

FIG. 4 is a partial hydraulic circuit diagram of a modified GM 4L80E transmission 400 for illustrating an exemplary embodiment of the present disclosure. In the example shown, transmission 400 is in first gear and manual valve 202 is in the overdrive position. The hydraulic circuits of transmission 400 are modified relative to the hydraulic circuits in the prior art GM 4L80E (FIGS. 2 and 3) by permanently blocking a portion of overrun clutch feed passageway 210 during all modes of operation at blockage 402. In the illustrated example, check ball seat passage 214 and orifice passage 216 are blocked. Thus, a portion of the hydraulic passageway upstream of manual valve 202 that normally provides pressurized fluid to the overrun clutch 122 is permanently blocked. Transmission 400 also includes an overrun clutch valve 404 located in an overrun clutch housing valve 406. The overrun clutch valve 404 and housing 406 are in fluid communication with line pressure passageway 408 and a portion of OE overrun clutch feed passageway 210 located downstream of blockage 402 such that the overrun clutch valve is configured to route line pressure pressurized transmission fluid to overrun clutch 122 to engage and disengage the overrun clutch. Overrun clutch valve 404 and housing 406 are also in fluid communication with fourth gear clutch feed passageway (also referred to herein as a top gear clutch feed passageway) 410, which provides pressurized transmission fluid to fourth gear clutch 121 (also referred to herein as a top gear clutch) when the transmission is in fourth gear. In the illustrated example, the fourth gear clutch feed passageway 410 is used to provide a control signal to open or close overrun clutch valve 404. Exemplary overrun clutch valve 404 includes a spring 412 that biases the valve to an open position thereby routing line pressure in line pressure passageway 408 to overrun clutch 122 such that the overrun clutch is normally engaged during all modes of operation regardless of the position of manual valve 202, except when transmission 400 is in fourth gear, in which case line pressure will be routed to fourth gear clutch feed passageway 410, causing overrun clutch valve 404 to close, blocking pressurized transmission fluid from passing to overrun clutch 122, allowing the clutch to disengage, which is required for the transmission to operate in fourth gear.

Figure 1:
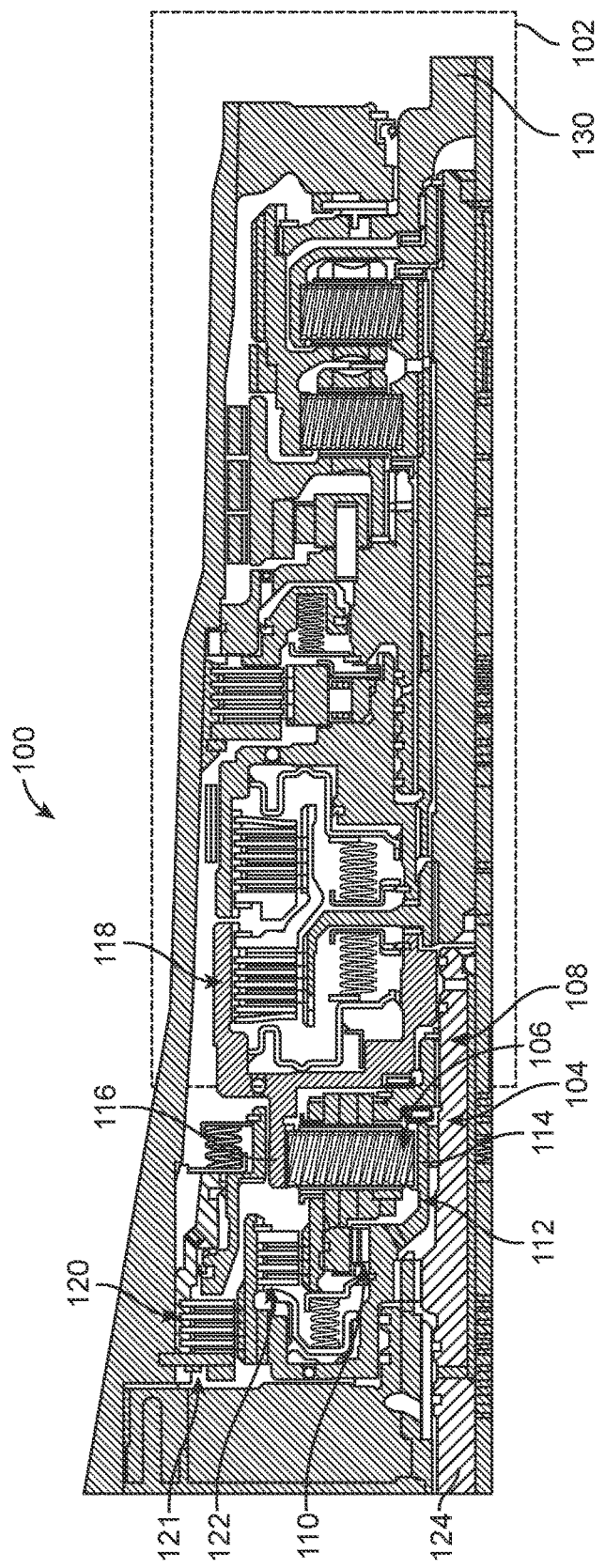
FIG. 1 is a cross sectional diagram of a top-half portion of a prior art General Motors (GM) 4L80-E four speed transmission.

In the illustrated example, prior art GM 4L80E transmission 100 (FIGS. 1-3) included a first clutch, e.g., roller clutch 110, for transmitting a force between turbine shaft 124 (FIG. 1) and at least one planetary gear set, e.g., the third, second, and first gear planetary gear sets located within dashed line 102 (FIG. 1), when manual valve 202 is in the overdrive position, which is the top gear position for the GM 4L80E. The prior art GM 4L80E transmission 100 also included a second clutch, e.g., overrun clutch 122, for transmitting a force between turbine shaft 124 and at least one planetary gear set, e.g., the third, second, and first gear planetary gear sets, when manual valve 202 is in at least one of manual positions manual 1 through 3 (lower gear positions). The example transmission 400 shown in FIG. 4 is a modified version of the prior art GM 4L80E transmission 100, with a hydraulic system that engages the second clutch, here the overrun clutch 122, when transmission 400 is in at least one of first through third gears when the manual valve is in the top gear position. In the illustrated example, the overrun clutch 122 is engaged in all gears, including reverse, except fourth, when the manual valve 202 is in any position 204, including in the top gear position. In the illustrated example, the overrun clutch is a non-hydraulic one-way roller clutch. In other examples, transmissions with other one-way clutches, such as sprag clutches, may be modified so that an additional clutch can be engaged in certain modes of operation to increase the strength and durability of the transmission. In the illustrated embodiment, overrun clutch 122 is a multi-plate clutch pack. In other examples, clutch types other than multi-plate may be engaged in certain modes of operation in lieu of or in addition to clutches normally engaged, to strengthen the transmission. In the illustrated example, transmission 400 includes overdrive planetary gear set 104 having an overdrive planetary carrier assembly 108 and sun gear 114. Both the first and second clutches, here, the overdrive roller clutch 110 and overrun clutch 122, when either are applied or engaged, prevent relative rotation between the overdrive planetary carrier assembly 108 and the overdrive sun gear 114 when being driven by the turbine shaft 124. Because the overdrive roller clutch 110 is a one-way clutch, it allows relative rotation between the overdrive planetary carrier assembly 108 and the overdrive sun gear 114 when coasting, i.e., when it is overrunning, i.e., not engaged. In other examples, a transmission having any other type of first and second clutches, where when either are applied, prevent relative rotation of the same two transmission components, can be modified such that one or both of the first and second clutches are engaged in additional modes of operation. For example, one of the first and second clutches may be stronger or more durable than the other, and the transmission hydraulic circuits may be modified such that the stronger or more durable clutch is engaged in additional modes of operation.

Figure 5:
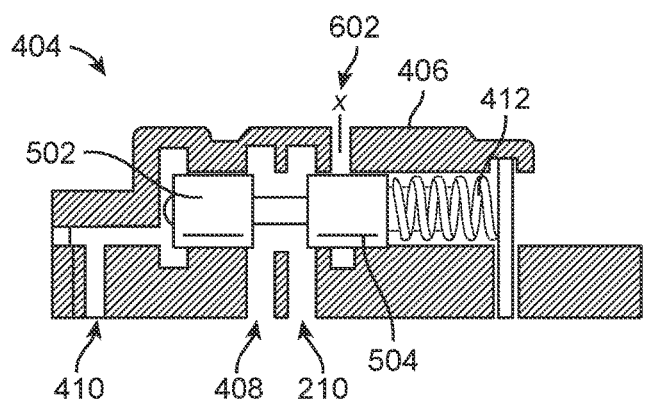
FIG. 5 is a cross-sectional view of an overrun clutch valve and housing, showing the valve in an open position.
Figure 6:
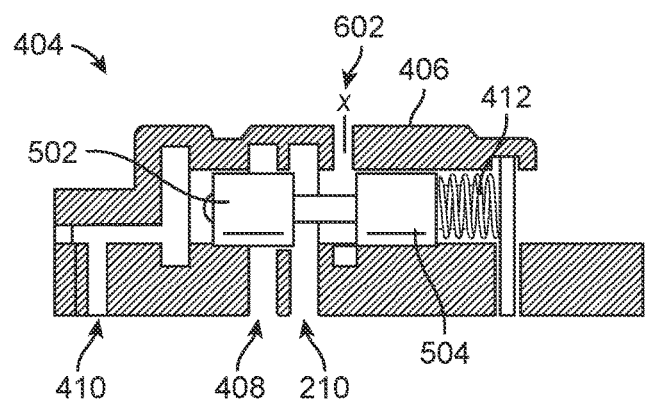
FIG. 6 is a cross-sectional view of the valve of FIG. 5 showing the valve in a closed position.

FIGS. 5 and 6 are cross-sectional views of overrun clutch valve 404 and housing 406, with FIG. 5 showing the valve in an open position and FIG. 6 the closed position. In the example shown, valve 404 is a spool valve with two lands 502, 504. When pressurized transmission fluid is not routed to fourth gear clutch feed passageway 410, spring 412 biases valve 404 to an open position, which allows pressurized fluid from line pressure passageway 408 to pass to overrun clutch feed passageway 210. When transmission 400 is in fourth gear, pressurized transmission fluid in fourth gear clutch feed passageway 410 acts on land 502, causing valve 404 to move to the right as shown in FIG. 6 such that land 502 blocks line pressure in line pressure passageway 408 from passing to overrun clutch feed passageway 210, and allows overrun clutch feed passageway to pass to exhaust 602, depressurizing the overrun clutch feed passageway and allowing overrun clutch 122 to open. In other examples, any of a number of other types of valves may be used for routing pressurized transmission fluid to overrun clutch 122, such as an electronically operated coast clutch, among others.

Figure 7:
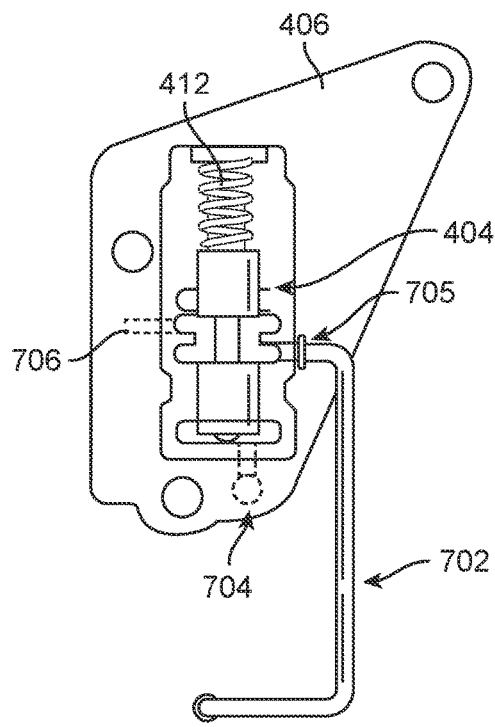
FIG. 7 is a top view of an overrun clutch valve and housing.
Figure 8:
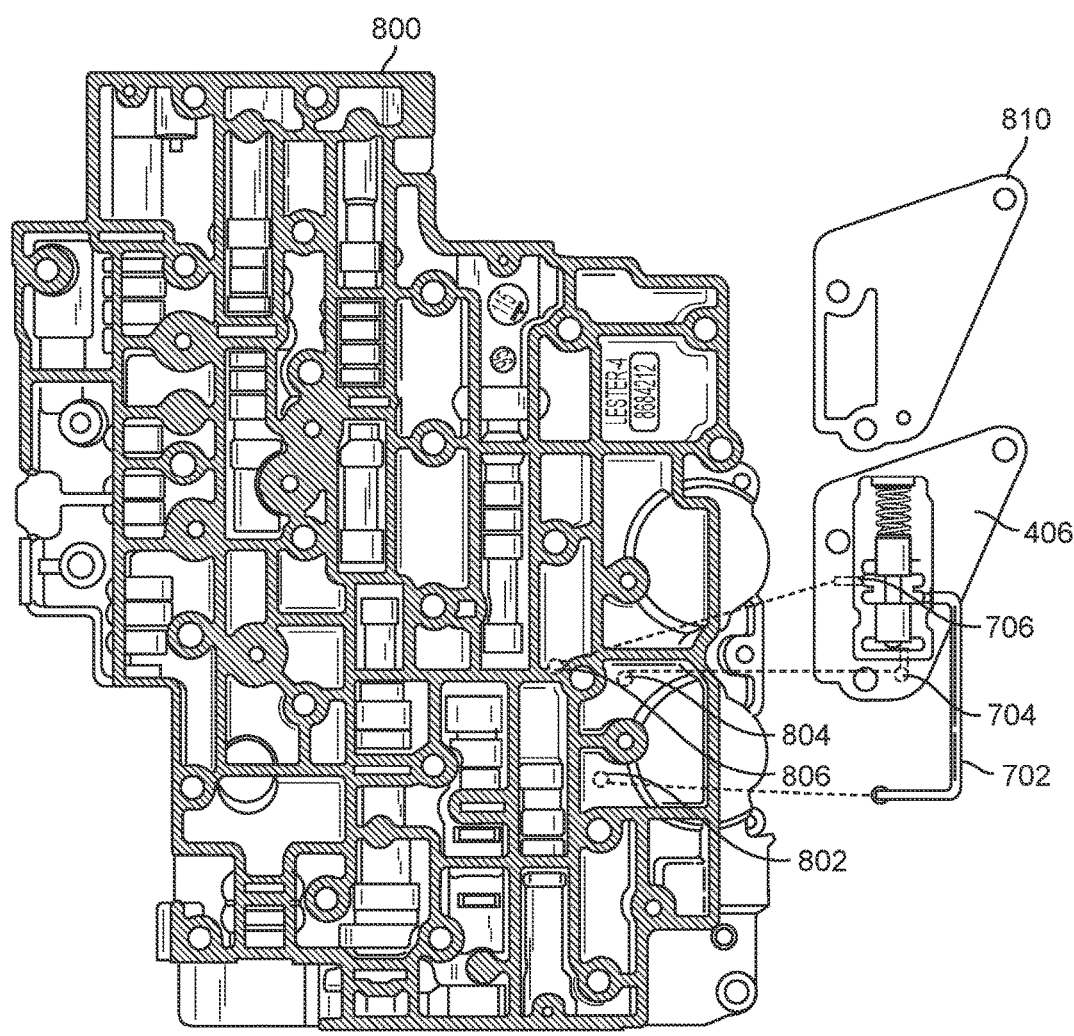
FIG. 8 is a diagram of a valve body casting and the overrun clutch valve and housing of FIG. 7.

FIGS. 7 and 8 show one example implementation of valve 404 and housing 406. In the illustrated example, a line pressure tube 702 is connected to a port 705 in a sidewall of housing 406 and extends from the housing to line pressure passageway 408 (FIG. 4) for routing line pressure to valve 404. Housing 406 also includes a fourth clutch feed port 704 in the base of the housing that, as described more below, can be connected to a tube positioned in a drilled passage in the transmission valve body casting for routing the fourth clutch feed circuit transmission fluid to the valve. Housing 406 also includes a overrun clutch feed port 706 in the base of the housing that, as described more below, can be fluidly connected to a drilled passage in the transmission valve body casting for connecting to the overrun clutch feed passageway 210 (FIGS. 5 and 6).

FIG. 8 shows overrun clutch valve 404 and housing 406 as well as a modified 4L80E transmission valve body casting. Drilled openings 802, 804, and 806 have been drilled in precise locations for connecting to line pressure passageway 408, fourth clutch feed passageway 410, and overrun clutch feed passageway 210, respectively (see FIGS. 5 and 6). Tube 702 can be connected to drilled opening 802, and fourth clutch feed port 704 and overrun clutch feed port 706 can be fluidly connected to drilled openings 804, 806, respectively, resulting in the modified hydraulic network illustrated in FIG. 4. FIG. 8 also shows a gasket 810 can be placed between housing 406 and valve body casting 800 to provide a fluid tight seal therebetween. FIGS. 7 and 8, therefore, illustrate an example external overrun clutch valve 404 and housing 406, which can be attached to the outside of a valve body casting, such as valve body casting 800, and connected to certain fluid circuits in the valve body to modify the operation of the transmission so that overrun clutch 122 remains engaged in additional modes of operation.

Figure 9:
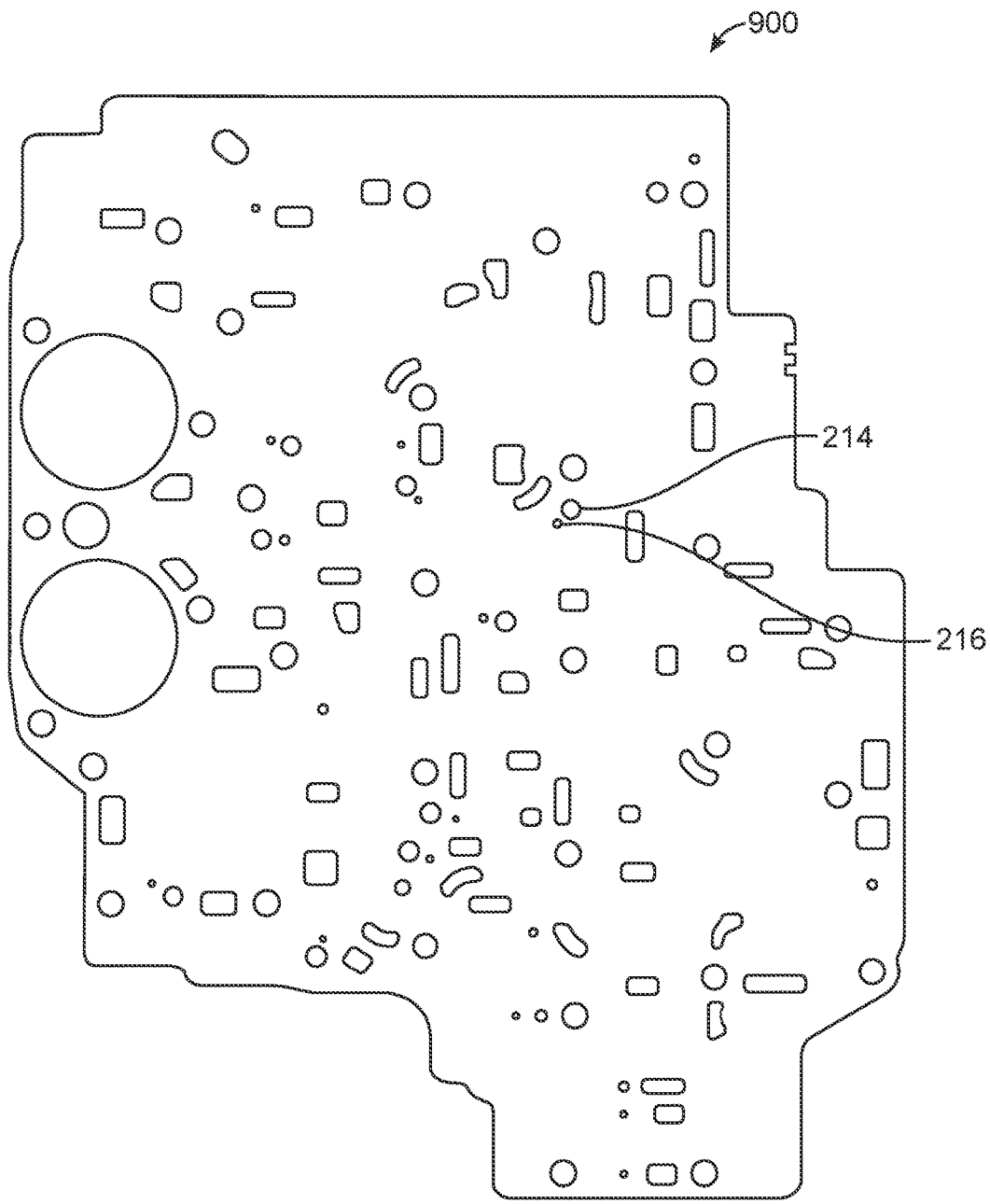
FIG. 9 shows a GM 4L80E valve body separator plate.

As noted above in connection with FIG. 4, in the example illustrated in FIG. 4, a portion of overrun clutch feed passageway 210 is permanently blocked so that overrun clutch 122 is not influenced by a position of manual valve 202. FIG. 9 shows one example for permanently blocking a portion of overrun clutch feed passageway 210. Specifically, FIG. 9 shows a OE GM 4L80E valve body separator plate 900. In the illustrated example, the check ball seat passage 214 and the check ball orifice passage 216 can be permanently blocked, e.g., with an aluminum plug, or by any other means, to create the blockage 402 shown in FIG. 4.

Figure 10:
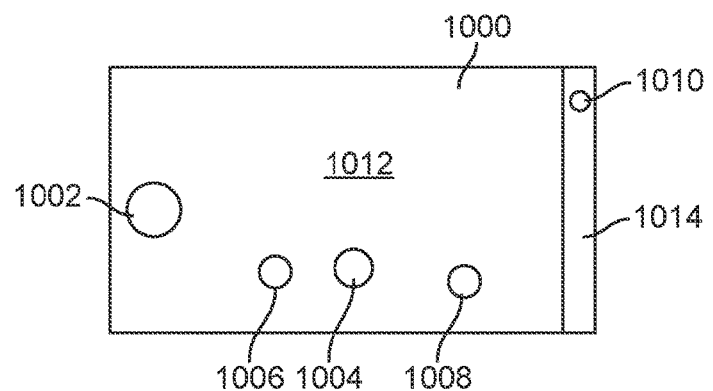
FIG. 10 is a top view of a drill template for modifying a transmission valve body.
Figure 11:
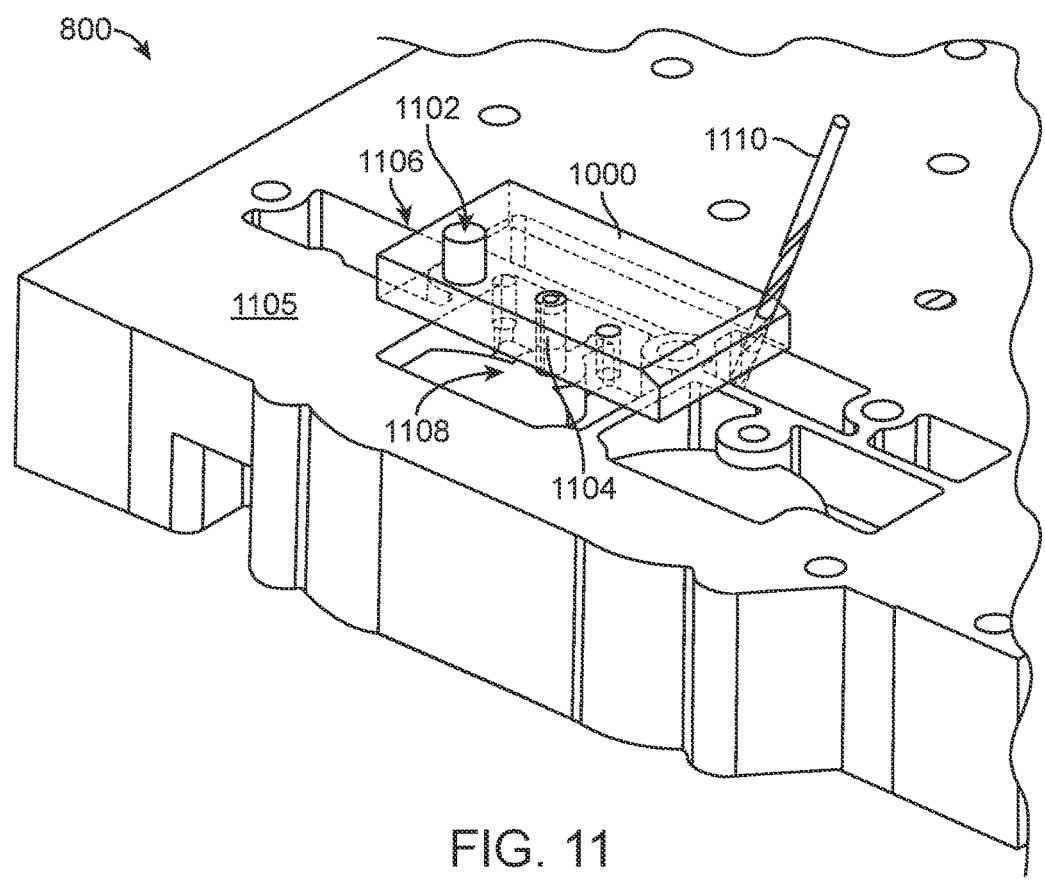
FIG. 11 is a perspective view of the drill template of FIG. 10 positioned on a valve body.

FIGS. 10 and 11 illustrate an example drill template 1000 that can be used for forming drilled openings 802, 804, 806 (FIG. 8) for connecting an external valve, such as valve 404, to a valve body such as valve body 800. Exemplary drill template 1000 has two locating pin holes 1002, 1004 for receiving locating pins 1102, 1104 (FIG. 11). The locating pin holes 1002, 1004 are positioned to align with two bolt hole recesses in valve body casting 800 and for locating pins 1102, 1104 to be slid through template 1000 and into the bolt hole recesses to precisely and repeatedly locate template 1000 on the valve body 800. Template 1000 also includes three guide bores 1006, 1008, and 1010 for precisely guiding drill bits for forming drilled openings 802, 804, and 806 (FIG. 8). Guide bores 1006 and 1008 extend through template 1000 from top surface 1012 of the template to the opposite bottom surface (not illustrated) and each have a central longitudinal axis that is substantially perpendicular to the template top surface, and when the template is placed on the valve body casting 800, perpendicular to the valve body casting surface 1105 the template is configured to rest against. In the illustrated example, guide bores 1006 and 1008 are larger than bore 1010 and are sized for forming holes for receiving tubes for connecting valve body passageways to valve 404. Specifically, bore 1006 is for forming drilled opening 802 (FIG. 8) for connecting to line pressure passageway 408 (FIG. 4), and bore 1008 is for forming drilled opening 804 (FIG. 8) for connecting to fourth gear clutch feed passageway 410 (FIG. 4). In the illustrated example, bore 1010 has a smaller diameter than bores 1006 and 1008 and extends from a chamfered edge 1014 of template 1000 to the bottom surface of the template at a non-perpendicular angle to template top surface 1012 and bottom surface, and when the template is placed on valve body casting 800, extends at a non-perpendicular angle to the surface 1105 of the valve body the template is configured to rest against, for drilling a non-perpendicular fluid passageway. Guide bore 1010 is for forming drilled opening 806 (FIG. 8) for connecting to overrun clutch feed passageway 210 (FIG. 4). In the illustrated example, drilled opening 806, which can be formed with guide bore 1010, is non-perpendicular to surface 1105 of valve body 800 so that a fluid connection in the transmission hydraulic network can be made at a location that is not directly beneath the location where the drilled hole begins on the valve body surface. In the illustrated example, guide bore 1010 is smaller because a tube is not used for making a fluid connection between valve 404 and overrun clutch feed passageway 210. FIG. 11 illustrates drill template 1000 placed on valve body 800, with only an outline of the template shown so that the portions of valve body 800 located under the template are visible. In the illustrated example, locating pin 1102 is a dowel pin and locating pin 1104 is a roll pin, also referred to as a spring pin or tension pin. Locating pins 1102 and 1104 are sized for precisely fitting with corresponding bolt hole recesses 1106, 1108 in valve body 800. FIG. 11 also shows a drill bit 1110 positioned in guide bore 1010 for forming drilled opening 806.

Figure 12:
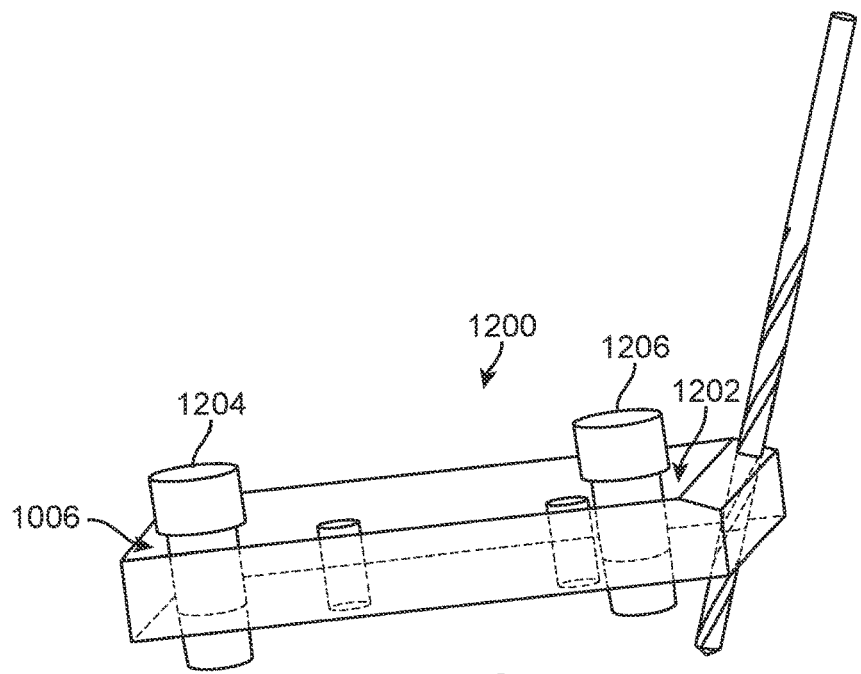
FIG. 12 is a perspective view of a drill template for modifying a transmission valve body.
Figure 13:
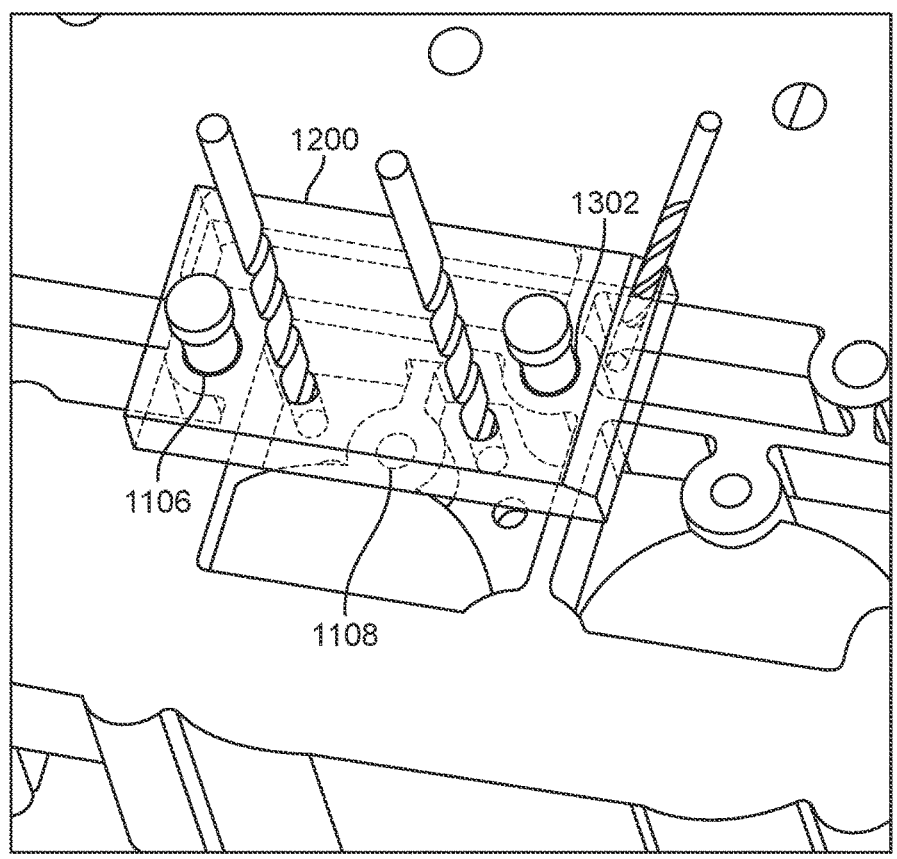
FIG. 13 is a perspective view of the drill template of FIG. 12 positioned on a valve body.
Figure 14:
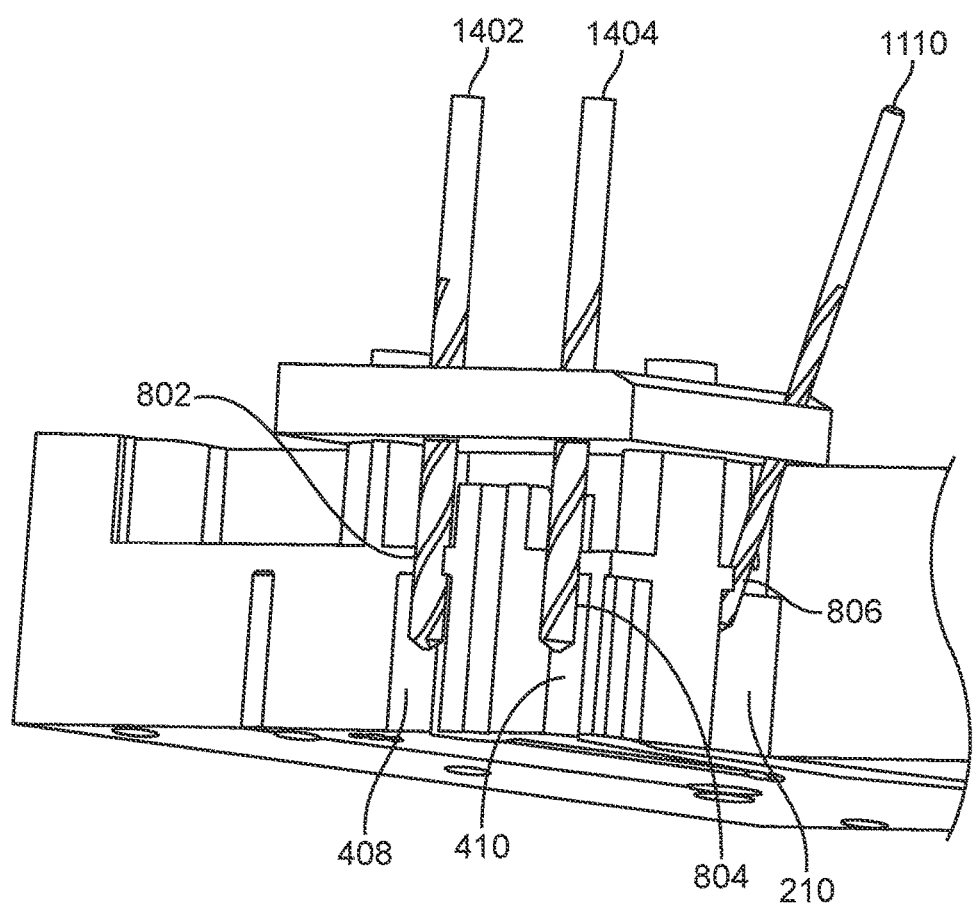
FIG. 14 is a perspective view of the drill template of FIGS. 12 and 13 positioned on the valve body of FIG. 13, showing a cross-sectional view of the valve body.

FIGS. 12-14 illustrate another example of a drill template 1200 for use in forming holes in a valve body casting, such as drilled openings 802, 804, and 806, for fluidly connecting an external valve, such as valve 404 (FIG. 4) to certain fluid circuits in the valve body. FIG. 13 shows only an outline of template 1200 so that the portions of valve body 800 located under the template are visible. Template 1200 is similar to template 1000 (FIG. 10), except that template 1200 has an alternate locating pin hole 1202 instead of locating pin hole 1004 for aligning with a third bolt hole recess 1302 (FIG. 13) in valve body casting 800. In another example, a template made in accordance with the present disclosure could include any two or more of locating pin holes 1002, 1004 and 1202 for use with removable locating pins. In another example, a template may include one or more fixed protrusions rather than one or more of the locating pin holes and removable locating pins. In another example, any other method for precisely locating a template on a valve body casting could be used, such as specifying distances between reference points on the valve body and the template with or without one or more locating pins. Two locating pins 1204, 1206 can be slidably disposed in locating pin holes 1002, 1202 and have a length that is greater than a thickness of the template for extending into bolt hole recesses 1106 and 1302 of casting 800 when the template is placed thereon for precisely locating the template on the valve body. Locating pins 1204 and 1206 have a stepped outer diameter that provides a stop that prevents over-insertion into and easy removal from the template. FIG. 14 illustrates a cross-sectional view of valve body casting 800 and shows template 1200 in use. A drill bit 1402 is shown forming drilled opening 802 for gaining access to line pressure passageway 408; a drill bit 1404 is shown forming drilled opening 804 for gaining access to fourth gear clutch feed passageway 410; and a drill bit 1110 is shown forming drilled opening 806 for gaining access to overrun clutch feed passageway 210.

Figure 15:
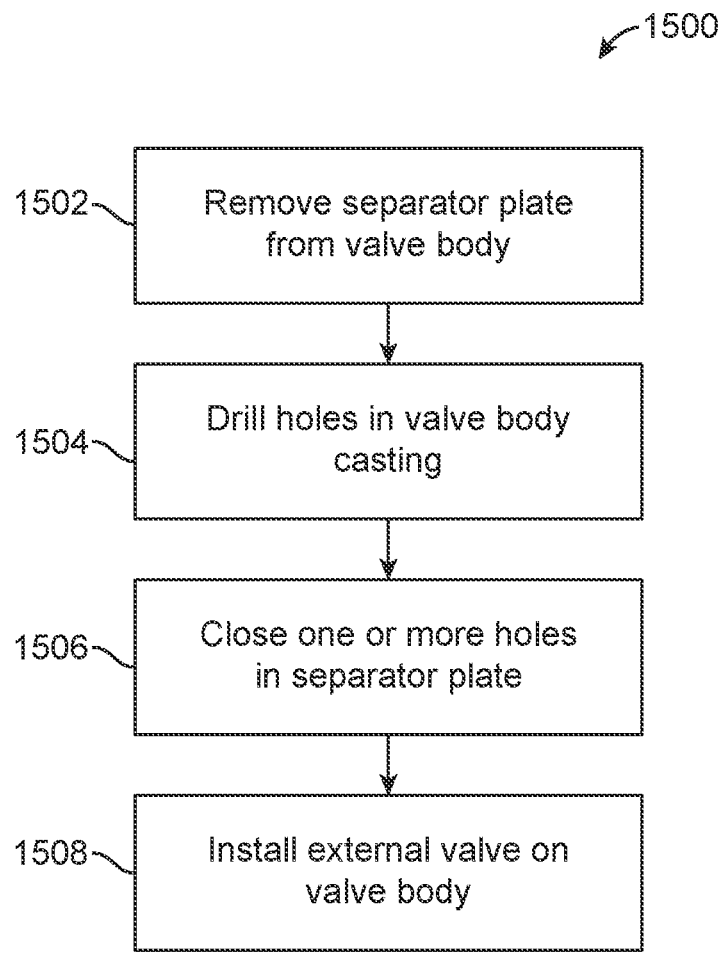
FIG. 15 is a flow chart showing the steps for modifying a transmission for increasing the strength of an automotive transmission.

FIG. 15 illustrates one example of a method 1500 of increasing the strength of an automotive transmission, which includes, at step 1502, removing a separator plate, such as separator plate 900 (FIG. 9), from a valve body, such as valve body 800 (FIG. 8), and at step 1504, drilling a plurality of holes, e.g., drilled openings 802, 804, 806, in a lower side of the valve body casting. In one example, the holes can be formed using a template, such as one of templates 1000 (FIG. 10) or 1200 (FIG. 12) with drill bits, such as drill bits 1402, 1404, and 1110 (FIG. 14). At step 1506, one or more holes in the separator plate can be closed, for example, holes for routing OE overrun clutch feed passage 210, by for example, inserting plugs, such as aluminum plugs, by, for example, using a hammer on a flat/steel surface to secure the aluminum plug(s) in the separator plate holes. At step 1508, the separator plate can be reassembled back onto the valve body, the valve body can be installed back onto the transmission case, and a gasket can be installed on the valve-body-mating side of an external spool valve housing, such as valve housing 406. A first tube can be inserted into the housing for providing a fluid connection between a valve disposed in the housing and one of the holes drilled in step 1504, e.g., a hole for connecting to fourth clutch feed passageway 410, and the housing can then be installed on the valve body, by, e.g., bolting the housing to the valve body in existing bolt holes with new longer bolts, e.g., supplied in a kit. A first end of a second tube, e.g., line pressure tube 702 (FIG. 7, 8) can then be installed in a port on a side of the housing, and the tube can be positioned for a second end of the tube to be inserted into another one of the holes drilled in step 1504 for gaining access to a line pressure cavity in the valve body. A retaining bracket may also be installed to secure the second tube, e.g., tube 702 to the valve body.

In one example, a kit for strengthening an automotive transmission may include an external valve and valve housing, such as valve 404 and housing 406. The kit may also include a drill template, such as template 1000 (FIG. 10) or 1200 (FIG. 12) for drilling one or more holes in precise locations for gaining access to specific fluid circuits in a valve body for connection to the external valve. The kit may also include bolts for bolting the housing to a valve body as well as one or more drill bits for use with the drill template and one or more locating pins for locating the template on the valve body. The kit may also include a gasket, such as gasket 810 (FIG. 8) for forming a fluid tight seal between the overrun clutch valve housing and valve body. The kit may also include at least one tube, such as tube 702, for connecting the valve and valve housing to holes formed in the valve body, at least one retaining bracket for securing the tube(s), an end plug, spring, sleeve, and tabbed bore plug for use with the valve and valve housing, and discs and/or plugs for blocking one or more openings in the separator plate.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of modifying an automatic transmission, the transmission having at least one planetary gear set that provides a plurality of forward gears including a top gear and at least one lower gear, a hydraulic system including fluid passages and a manual valve having a top gear position in which the transmission will automatically shift between all of the forward gears and at least one lower gear position in which the transmission will not shift into the top gear, and a hydraulic clutch, wherein the manual valve controls the hydraulic clutch via direct fluid communication through the fluid passages and only engages the hydraulic clutch when the manual valve is in the at least one lower gear position, the method comprising:

modifying the hydraulic system to eliminate said direct fluid communication so that the hydraulic clutch is not controlled by the manual valve and the hydraulic clutch is engaged whenever the transmission is in the at least one lower gear.

2. The method according to claim 1, wherein the modifying step includes adding a valve to the hydraulic system that controls the hydraulic clutch.

3. The method according to claim 1, wherein the hydraulic system includes a hydraulic clutch feed passage that routes pressurized hydraulic fluid to the hydraulic clutch, wherein the modifying step includes:

permanently blocking a portion of the hydraulic clutch feed passage; and adding a valve to the hydraulic system that routes hydraulic fluid to the hydraulic clutch to apply the hydraulic clutch.

4. The method according to claim 3, wherein the transmission further includes a separator plate with a plurality of openings, including at least one opening through which the hydraulic clutch feed passage extends, the permanently blocking step including permanently blocking the at least one opening in the separator plate.

5. The method according to claim 3, wherein the hydraulic system includes a top gear clutch feed for applying a top gear clutch when the transmission is in the top gear, the method further comprising fluidly connecting the top gear clutch feed to the valve for use as a control signal for opening and closing the valve.

6. The method according to claim 1, wherein prior to the modifying step, the hydraulic clutch is never engaged when the manual valve is in the top gear position.

7. The method according to claim 1, wherein the transmission further comprises a non-hydraulic one-way clutch and the at least one planetary gear set includes an overdrive planetary carrier assembly and an overdrive sun gear, wherein both the non-hydraulic one-way clutch and the hydraulic clutch, when either are engaged, prevent relative rotation between the overdrive planetary carrier assembly and the overdrive sun gear.

8. The method according to claim 1, wherein the transmission includes a reverse gear and prior to the modifying step, the hydraulic clutch is never engaged when the transmission is in reverse, wherein the method further comprises modifying the hydraulic system so that the hydraulic clutch is engaged when the transmission is reverse.

9. The method according to claim 1, wherein the transmission is a General Motor's model number 4L80-E transmission.

10. A method of modifying a transmission, the transmission having a plurality of forward gears including a top gear and at least one lower gear, a hydraulic clutch, a hydraulic system including a clutch feed passageway for engaging the hydraulic clutch and a line pressure passageway, and a manual valve that controls the hydraulic clutch and controls a range of the forward gears the transmission will shift between, the method comprising:

fluidly connecting a valve to the clutch feed passageway and line pressure passageway so that the valve engages the hydraulic clutch independently of a position of the manual valve.

11. The method according to claim 10, further comprising permanently blocking a portion of the clutch feed passageway.

12. The method according to claim 10, the transmission further comprising a top gear clutch feed passageway for applying a top gear clutch, the method further comprising fluidly connecting the valve to the top gear clutch feed passageway for closing the valve when the top gear clutch is applied.

13. The method according to claim 10, wherein the transmission includes a reverse gear and the hydraulic clutch is never engaged when the transmission is in the reverse gear, wherein after the modifying step, the hydraulic clutch is engaged when the transmission is in the reverse gear.

14. A kit for modifying an automatic transmission, the automatic transmission including a valve body having a line pressure passageway, a hydraulic clutch feed passageway, and a top gear clutch feed passageway, the kit comprising:

a valve for fluidly connecting the line pressure passageway to the hydraulic clutch feed passageway and for fluidly connecting the valve to the top gear clutch feed passageway, the valve being configured to close when the top gear clutch is applied; and a drill template for drilling a plurality of openings in the valve body for fluidly connecting the line pressure passageway, the hydraulic clutch feed passageway, and the top gear clutch feed passageway to the valve.

15. The kit according to claim 14, wherein the valve is configured to be attached to the valve body.

16. The kit according to claim 14, wherein the transmission further includes a separator plate with a plurality of openings, including at least one opening through which the hydraulic clutch feed passageway extends, the kit further comprising at least one plug for permanently closing the at least one opening.

17. The kit according to claim 14, wherein the kit further comprises at least one tube for connecting at least one of the plurality of openings in the valve body formed from use of the drill template with the valve.

* * * * *